United States Patent
Jeong (10) Patent No.: US 8,106,980 B2
(45) Date of Patent: Jan. 31, 2012

(54) IMAGE SENSOR HAVING HIGH SPEED OPERATION

(75) Inventor: Young-Kyun Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 572 days.

(21) Appl. No.: 12/319,757

(22) Filed: Jan. 12, 2009

(65) Prior Publication Data
US 2009/0190011 A1    Jul. 30, 2009

(30) Foreign Application Priority Data
Jan. 28, 2008    (KR) .................. 10-2008-0008608

(51) Int. Cl.
*H04N 3/14*    (2006.01)
*H04N 5/335*    (2011.01)

(52) U.S. Cl. ......... 348/294; 348/300; 348/302; 348/308

(58) Field of Classification Search .................. 348/294, 348/300, 302, 308
See application file for complete search history.

(56) References Cited

U.S. PATENT DOCUMENTS
6,362,767 B1    3/2002  Yang et al. .................... 341/155
2004/0189840 A1*  9/2004  McCaffrey et al. ........... 348/294

OTHER PUBLICATIONS

Korean Patent Publication No. 1020040039703 to Kim, having Publication date of May 12, 2004 (w/ English Abstract page).
Korean Patent Publication No. 1020070069874 to Kang, having Publication date of Jul. 3, 2007 (w/ English Abstract page).
Japanese Patent Publication No. 11-154865 to Yukio, having Publication date of Jun. 8, 1999 (w/ English Abstract page).

* cited by examiner

*Primary Examiner* — William Choi
(74) *Attorney, Agent, or Firm* — Monica H. Choi (57) ABSTRACT

An image sensor includes a data formatter and a transformer. The data formatter divides N-bit data into K-bit units with N and K being natural numbers and with K<N. The transformer is configured to generate an output signal having a respective signal level selected from at least three possible levels depending on each K-bit unit received from the data formatter for high speed operation of the transformer and the data formatter.

20 Claims, 7 Drawing Sheets

IMAGE SENSOR HAVING HIGH SPEED OPERATION

BACKGROUND OF THE INVENTION

This application claims priority under 35 USC §119 to Korean Patent Application No. 10-2008-0008608, filed on Jan. 28, 2008 in the Korean Intellectual Property Office, the disclosure of which is incorporated herein in its entirety by reference.

1. Field of the Invention

The present invention relates generally to image sensors, and more particularly, to an image sensor transmitting a large amount of data at high speed.

2. Background of the Invention

Figure 1:
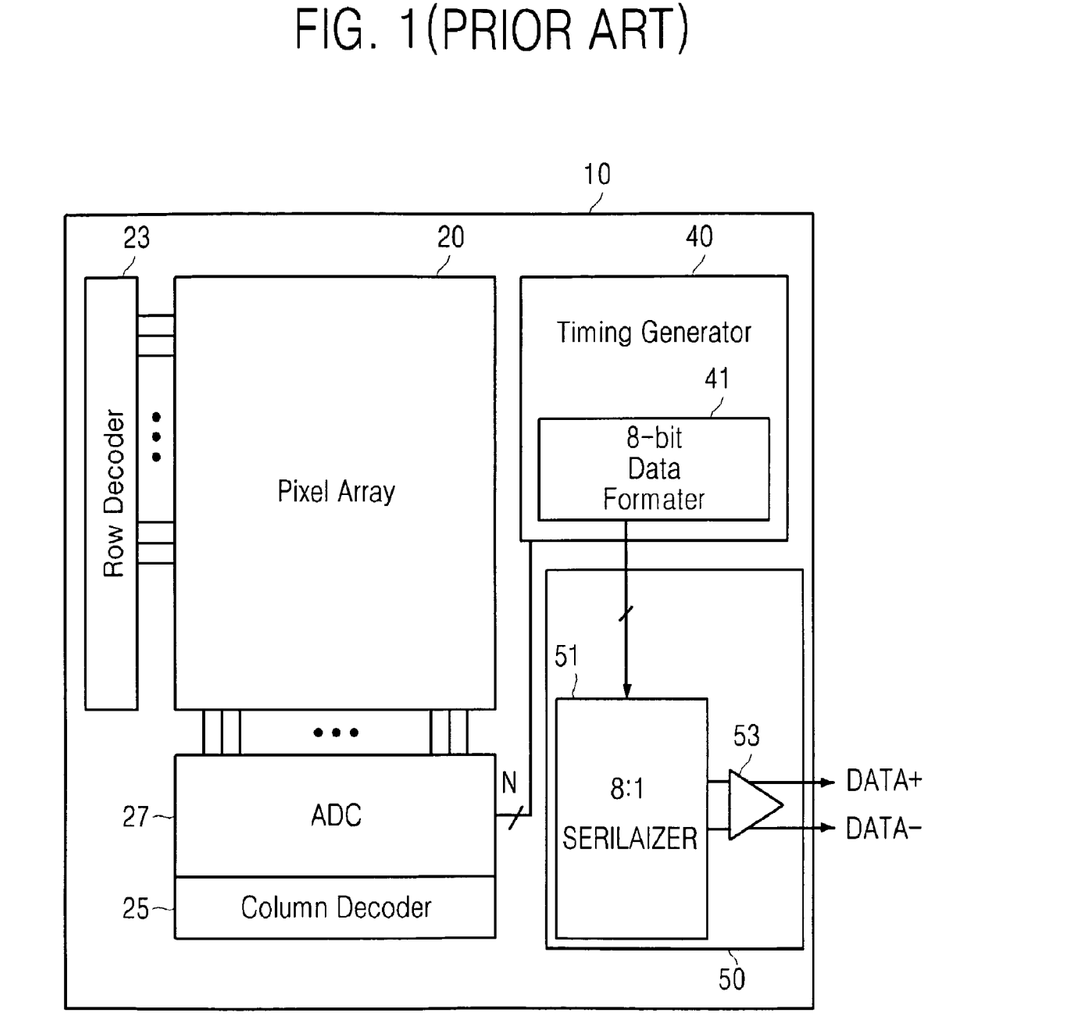
FIG. 1 shows a block diagram of a conventional image sensor.

FIG. 1 shows a block diagram of a conventional image sensor 10. Referring to FIG. 1, the image sensor 10 includes a pixel array 20, a row decoder 23, a column decoder 25, an analog-to-digital converter (ADC) 27, a timing generator 40, and an output unit 50. The pixel array 20 includes a plurality of unit pixels arranged in a matrix of rows and columns. The pixel array 20 outputs analog signals generated from a received image to the ADC 27.

The row decoder 23 is connected to the pixel array 20 for sequentially selecting rows of the pixel array 20 to output signals in a predetermined order. The column decoder 25 is connected to the pixel array 20 for sequentially selecting columns in the pixel array 20 to output signals via the ADC 27 in a predetermined order.

Figure 2:
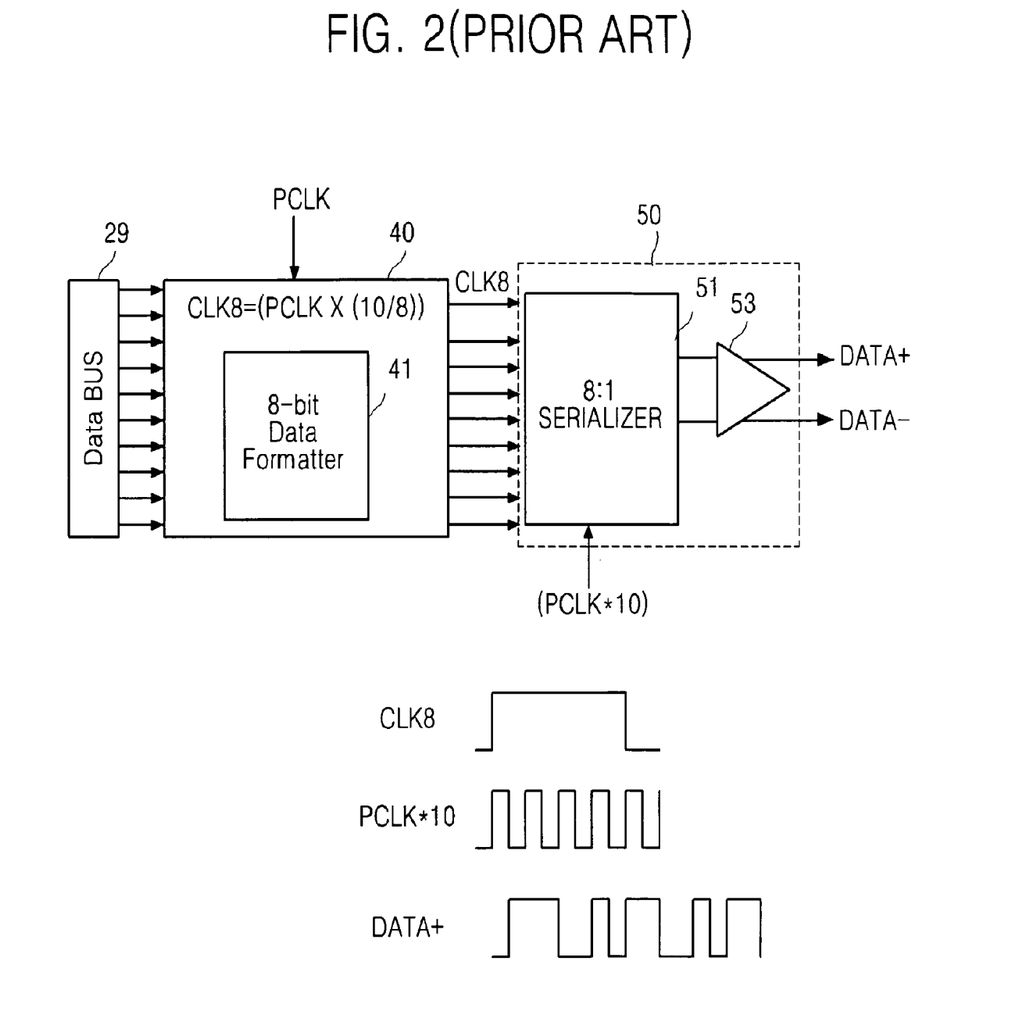
FIG. 2 shows a more detailed block diagram of a data bus, a timing generator, and an output unit of FIG. 1 along with a timing diagram illustrating operation of the output unit in the prior art.

In other words, the analog signals generated by the pixels as selected by the row decoder 23 and the column decoder 25 are output to the ADC 27. The ADC 27 converts such analog signals from the selected pixels of the pixel array 20 into N-bit data (where N is a natural number, for example, N=10) and outputs the N-bit data to a data bus 29 (FIG. 2). For example, the respective analog signal from each selected pixel is converted by the ADC 27 into a respective N-bit data.

The timing generator 40 generates a first clock signal CLK8 from an external clock signal PCLK. The timing generator 40 includes an 8-bit data formatter 41. The 8-bit data formatter 41 divides 10-bit data (i.e., the N-bit data from the ADC 27) into 8-bit units in response to the first clock signal CLK8. The data formatter 41 outputs a single data set of 8 bits to the output unit 50 in response to the first clock signal CLK8.

FIG. 2 shows a more detailed block diagram of the data bus 29, the timing generator 40, and the output unit 50 with a timing diagram for illustrating operation of such components. Referring to FIG. 2, the output unit 50 includes a serializer 51 and an output buffer 53.

The data bus 29 transmits 10-bit parallel data (i.e., N-bit data) output from the ADC 27 to the timing generator 40 via a plurality of transmission lines. The timing generator 40 generates the first clock signal CLK8 from the external clock signal PCLK. For example, the first clock signal CLK8 has a period that is eight times the period of an intermediate clock signal (PCLK*10) having a frequency that is the external clock signal PCLK frequency multiplied by 10. Thus, the first clock signal CLK8 has a frequency that is ⅛ of the frequency of the intermediate clock signal (PCLK*10). Another words, the first clock signal CLK8 has a frequency that is PCLK* (10/8).

The timing generator 40 includes the 8-bit data formatter 41 that divides the 10-bit parallel data into 8-bit units and outputs the 8-bit units in response to the first clock signal CLK8. For example, when the 8-bit data formatter 41 receives the 10-bit data through the data bus 29, the 8-bit data formatter 41 divides the 10-bit data into an 8-bit unit in response to the first clock signal CLK8 and outputs such 8-bit data in parallel to the serializer 51 in response to the first clock signal CLK8.

Also, the 8-bit data formatter 41 latches the remaining 2-bits of the 10-bit parallel data and then outputs another 8-bit parallel data composed of such latched 2-bits of the prior 10-bit parallel data and 6-bits of a subsequent 10-bit parallel data to the serializer 51. The 8-bit data formatter 41 then latches the remaining 4-bits of such subsequent 10-bit parallel data for generating another 8-bit unit.

Since the 8-bit data formatter 41 receives 10-bit parallel data and outputs 8-bit parallel data to the serializer 51 in response to the first clock signal CLK8, the 8-bit data formatter 41 must wait for the subsequent 10-bit parallel data for outputting all of the 10-bits of any 10-bit parallel data to the serializer 51. Such wait results in undesired delay during data transmission.

SUMMARY OF THE INVENTION

Accordingly, an image sensor according to embodiments of the present invention transmits data at high speed using a faster modified clock signal.

An image sensor according to an aspect of the present invention includes a data formatter and a transformer. The data formatter divides N-bit data into K-bit units with N and K being natural numbers and with K<N. The transformer is configured to generate an output signal having a respective signal level selected from at least three possible levels depending on each K-bit unit received from the data formatter.

In an example embodiment of the present invention, the image sensor further includes a pixel array and an analog-to-digital converter. The pixel array generates an analog signal from an image. The analog-to-digital converter generates the N-bit data from the analog signal.

In a further embodiment of the present invention, N/K is a natural number greater than 1. The N-bit data is timed to an original clock signal, and the K-bit units are timed to a modified clock signal having a period that is K-times a period of the original clock signal.

In another embodiment of the present invention, the data formatter generates the modified clock signal. In that case, the image sensor further includes a clock buffer disposed in the transformer for generating a buffered clock signal from the modified clock signal.

In a further embodiment of the present invention, the transformer includes an encoder and a level generator. The encoder transforms each K-bit unit from the data formatter into a respective M-bit data with M>K. The level generator generates the output signal having the respective signal level depending on the respective M-bit data.

In an example embodiment of the present invention, the respective M-bit data is a respective thermometer code for each K-bit unit. The encoder operates with the modified clock signal. For example, the encoder includes a plurality of logic gates each inputting at least one bit of a K-bit unit. The encoder also includes a plurality of flip-flops for latching an output of a respective logic gate according to the modified clock signal.

In a further embodiment of the present invention, the level generator includes a plurality of amplifiers each inputting a differential pair of a respective bit of each M-bit data. The plurality of amplifiers have differential outputs that are coupled to generate complementary outputs of the output signal.

In an example embodiment of the present invention, N=10, K=2, and M=3, and the signal level of the output signal is selected from four possible levels.

The present invention may be used to particular advantage when the image sensor is a CMOS (complementary metal oxide semiconductor) image sensor. However, the present invention may be practiced with other types of image sensors.

In this manner, the transformer operates with the modified clock signal having a higher frequency than in the prior art resulting in high speed operation for transmitting data as the output signal. Furthermore, each K-bit unit is generated from one N-bit data without waiting for a subsequent N-bit data for higher speed operation of the data formatter.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, and 7 refer to elements having similar structure and/or function.

DETAILED DESCRIPTION OF THE INVENTION

The present invention is now described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 3:
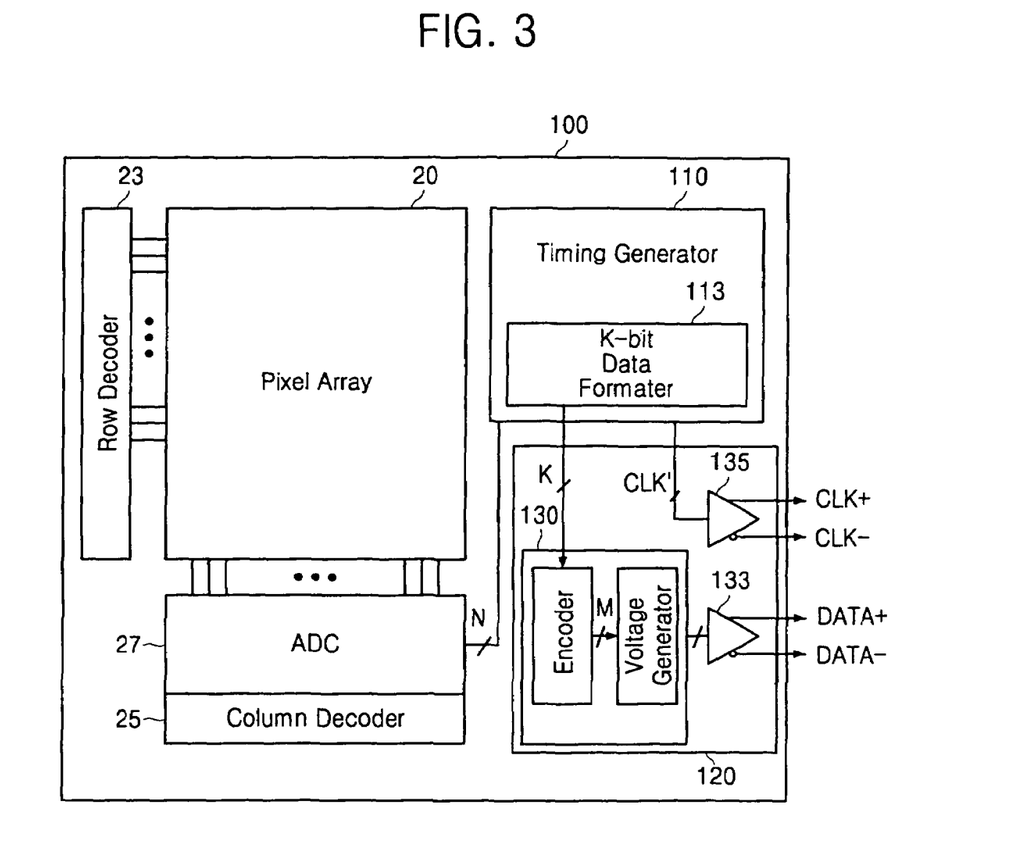
FIG. 3 shows a block diagram of an image sensor, according to an example embodiment of the present invention.
Figure 4:
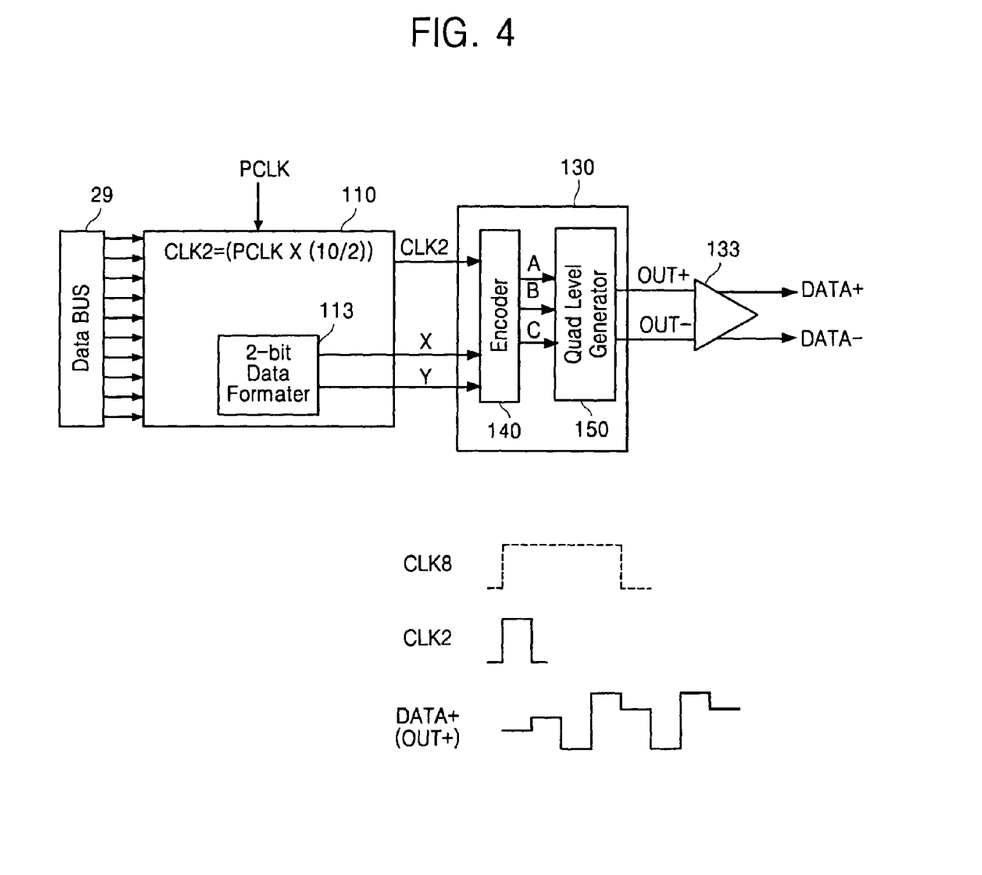
FIG. 4 shows a more detailed block diagram of a data bus, a timing generator, and an output unit of FIG. 3 along with a timing diagram illustrating operation of the output unit, according to an example embodiment of the present invention.

FIG. 3 shows a block diagram of an image sensor 100 according to an example embodiment of the present invention. FIG. 4 shows a more detailed block diagram of a data bus 29, a timing generator 110, and an output unit 120 of FIG. 3 along with a timing diagram illustrating operation of the output unit 120, according to an example embodiment of the present invention.

Referring to FIGS. 3 and 4, the image sensor 100 includes a pixel array 20, a row decoder 23, a column decoder 25, an analog-to-digital converter (ADC) 27, a timing generator 110, and an output unit 120. The operation of the components 20, 23, 25, and 27 of FIG. 3 are similar as those of the similarly numbered elements 20, 23, 25, and 27 of FIG. 1. Thus, a detailed description thereof is omitted.

The timing generator 110 includes a K-bit data formatter 113. The K-bit data formatter 113 divides N-bit data (where N is a natural number, for example, N=10) from the ADC 27 into K-bit units (where K is a natural number and K<N, for example, K=2). In addition, N/K is a natural number, according to an example embodiment of the present invention. The timing generator 110 also outputs at least one data set of K bits to the output unit 120 in response to a modified clock signal CLK2.

The output unit 120 includes a transformer 130, a data output buffer 133, and a clock output buffer 135. The transformer 130 encodes a data set of K bits output from the K-bit data formatter 113 in response to the modified clock signal CLK2 to generate differential output signals OUT+ and OUT− each having a respective signal level corresponding to a result of the encoding.

The data output buffer 133 buffers the differential output signals OUT+ and OUT− from the transformer 130 to generate buffered differential output signals DATA+ and DATA− to transmission lines. The data output buffer 133 may be implemented as a differential amplifier. The clock output buffer 135 outputs buffered differential clock signals CLK+ and CLK− in response to differential clock signals CLK' and /CLK' that may be complementary pairs of the modified clock signal CLK2 from the timing generator 110. The clock output buffer 135 may also be implemented as a differential amplifier.

The timing generator 110 generates the modified clock signal CLK2 from an external clock signal PCLK. For example, the modified clock signal CLK2 has a period that is two times the period of an intermediate clock signal (PCLK*10) having a frequency that is the external clock signal frequency (PCLK) multiplied by 10. Each bit of the N-bit data is timed to the intermediate clock signal (PCLK*10) (i.e., an original clock signal). Thus, the modified clock signal CLK2 has a frequency that is ½ of the frequency of the intermediate clock signal (PCLK*10). Another words, the modified clock signal CLK2 has a frequency that is PCLK*(10/2).

The timing generator 110 includes the K-bit data formatter 113. The K-bit data formatter 113 receives N-bit data from the ADC 27 through the data bus 29. The K-bit data formatter 113 also generates at least one data set by dividing the N-bit data into K-bit units in response to the modified clock signal CLK2. The K-bit data formatter 113 sequentially outputs such at least one data set in response to the modified clock signal CLK2.

The K-bit data formatter 113 is illustrated as a 2-bit data formatter with K=2 in the example embodiment of FIG. 4. The 2-bit data formatter 113 divides N-bit parallel data, for example, 10-bit parallel data with N=10, into 2-bit units in response to the modified clock signal CLK2. In that case, the 2-bit data formatter 113 generates five data sets (i.e., five 2-bit units from each N-bit parallel data). The 2-bit data formatter 113 sequentially transmits such five data sets of 2 bits to the transformer 130 through two transmission lines X and Y in response to the modified clock signal CLK2.

The transformer 130 includes an encoder 140 and a level generator 150. The encoder 140 transforms each data set of 2 bits received from the 2-bit data formatter 113 into respective M-bit data (M being a natural number, for example, M=3). Such respective M-bit data is a respective M-bit thermometer code in an example embodiment of the present invention. Thus, the example encoder 140 in FIG. 4 has two inputs (K=2) and three outputs (M=3). The transformer 130 transforms the K-bit data into M-bit data that may represent $2^K$ levels.

The level generator 150 generates the data output signal OUT+ having a signal level selected from a plurality of possible voltage levels depending on the 3-bit thermometer code ABC from the transformer 130. The operations of the encoder 140 and the level generator 150 will be described in more detail with reference to FIGS. 5 and 6. The data output buffer 133 buffers the differential data output signals OUT+ and OUT− from the level generator 150 to generate buffered differential data output signals DATA+ and DATA−.

Figure 5:
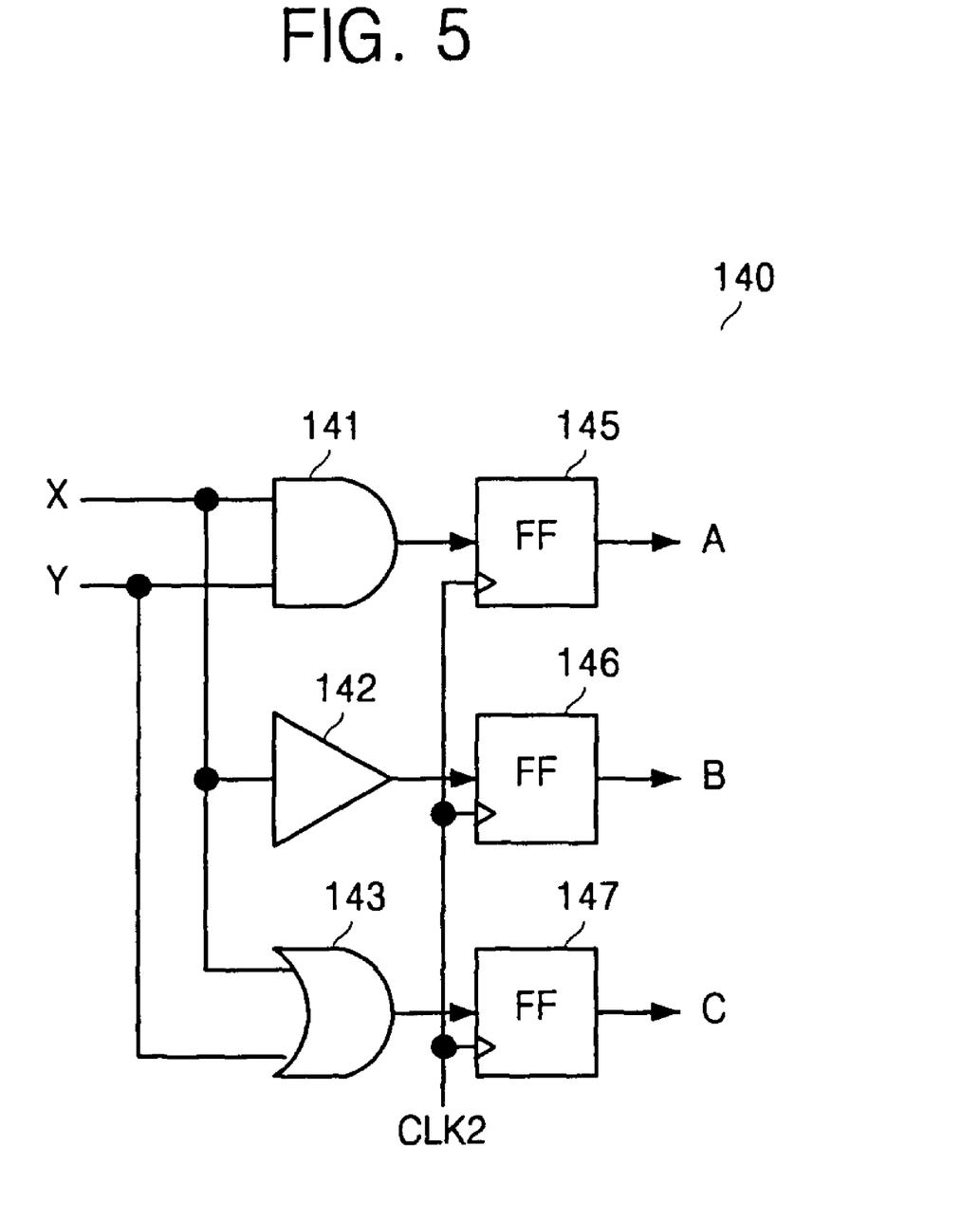
FIG. 5 is a circuit diagram of an encoder in FIG. 4, according to an example embodiment of the present invention.

FIG. 5 is a circuit diagram of the encoder 140 of FIG. 4, according to an example embodiment of the present invention. The encoder 140 encodes each 2-bit data XY from the 2-bit data formatter 113 to generate the 3-bit thermometer code ABC in response to the modified clock signal CLK2.

Referring to FIGS. 2 and 4, when the maximum frequency of the external clock signal PCLK is 162.5 MHz, the maximum frequency of the first clock signal CLK8 of FIG. 2 is 203.125 MHz (=162.5 MHz*10/8). In contrast, in the image sensor 100 of FIG. 3 according to an example embodiment of the present invention, the transformer 130 encodes data at 812.5 MHz (=162.5 MHz*10/2) to generate serialized output data at 812.5 MHz. Thus, the image sensor 100 of FIG. 3 operates at higher speed of 812.5 MHz versus the 203.125 MHz of the conventional image sensor 10 of FIG. 1.

Referring to FIG. 5, the encoder 140 receives first input data bit X and second input data bit Y that form the 2-bit data unit from the 2-bit data formatter 113. The encoder performs a logical operation on such bits X and Y to generate the 3-bit thermometer code ABC. To that end, the encoder 140 includes a plurality of logic gates including an AND gate 141, a buffer gate 142, and an OR gate 143. The encoder 140 also includes a plurality of flip-flop latches including a first flip-flop latch 145, a second flip-flop latch 146, and a third flip-flop latch 147.

The AND gate 141 performs an AND operation on the first and second input data bits X and Y. The output of the AND gate 141 is input by the first latch 145. The buffer gate 142 buffers the first input data bit X to generate a buffered output that is input by the second latch 146. The OR gate 143 performs an OR operation on the first and second input data bits X and Y. The output of the OR gate 143 is input by the third latch 147. The first, second, and third latches 145, 146, and 147, respectively, latch the output from the logic gates 141, 142, and 143, respectively, in response to the modified clock signal CLK2.

Table 1 below shows an example of the respective M-bit thermometer code ABC generated for each possible K-bit unit XY as generated by the encoder 140.

TABLE 1

| Input XY | Thermometer code ABC |
|----------|----------------------|
| 00 | 000 |
| 01 | 001 |
| 10 | 011 |
| 11 | 111 |

Figure 6:
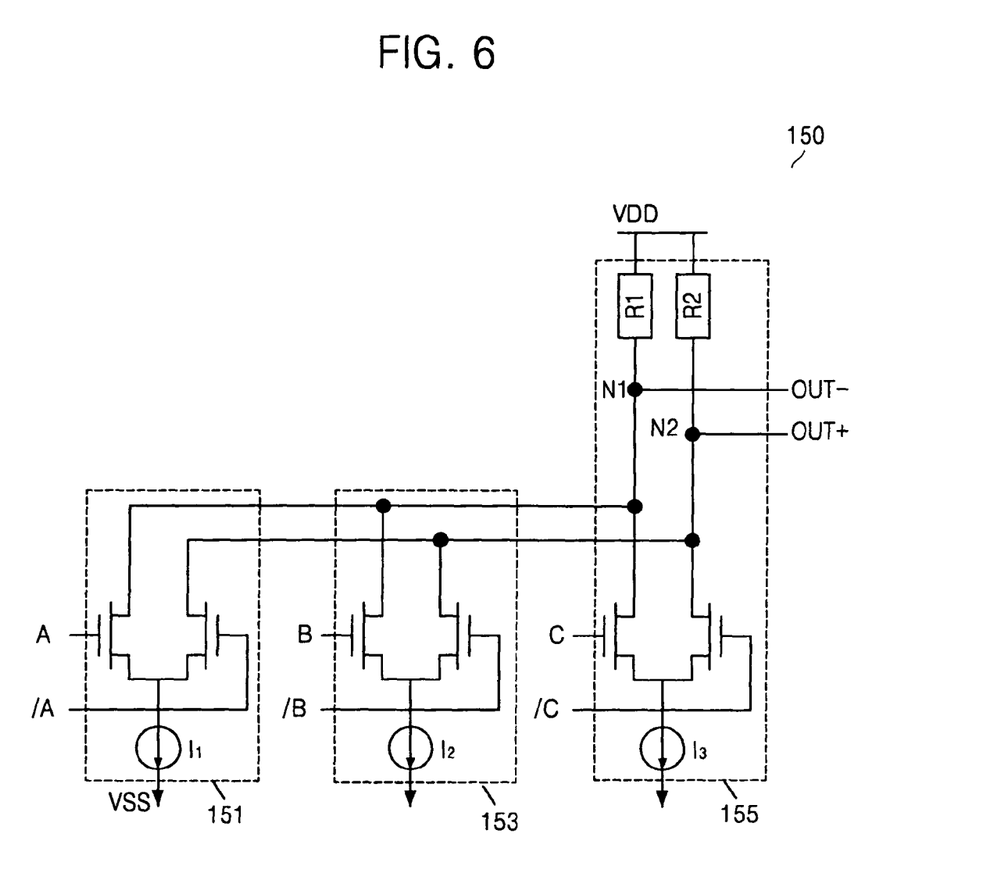
FIG. 6 is a circuit diagram of a level generator in FIG. 4, according to an example embodiment of the present invention.

The level generator 150 outputs the data output signal OUT+ having a voltage level that is selected from four possible voltage levels depending on the 3-bit thermometer code ABC. FIG. 6 is a circuit diagram of the level generator 150 of FIG. 4 according to an example embodiment of the present invention.

In FIG. 6, "A" and "/A" denote differential or complementary levels for data bit A of the thermometer code ABC. Similarly, "B" and "/B" denote differential or complementary levels for data bit B of the thermometer code ABC. Also, "C" and "/C" denote differential or complementary levels for data bit C of the thermometer code ABC. The level generator 150 outputs the data output signal OUT+ having one of a plurality of possible voltage levels illustrated in FIG. 7 in response to the 3-bit thermometer code ABC, and also outputs the data output signal OUT− that is a complementary level of the data output signal OUT+. The level generator 150 includes a first amplifier 151, a second amplifier 153, and a third amplifier 155.

The first amplifier 151 includes a first current source $I_1$ and a pair of transistors configured as illustrated in FIG. 6. The first amplifier 151 amplifies a voltage difference between the data bit signals A and /A to generate amplified signals through output terminals N1 and N2 having resistances R1 and R2, respectively, coupled thereto.

The second amplifier 153 includes a second current source $I_2$ and a pair of transistors configured as illustrated in FIG. 6. The second amplifier 153 amplifies a voltage difference between the data bit signals B and /B to generate amplified signals through the output terminals N1 and N2. The third amplifier 155 includes a third current source 13 and a pair of transistors configured as illustrated in FIG. 6. The third amplifier 155 amplifies a voltage difference between the data bit signals C and /C to generate amplified signals through the output terminals N1 and N2. Currents flowing in the first, second, and third current sources $I_1$, $I_2$, and $I_3$ may be the same or may be scaled to be different.

Figure 7:
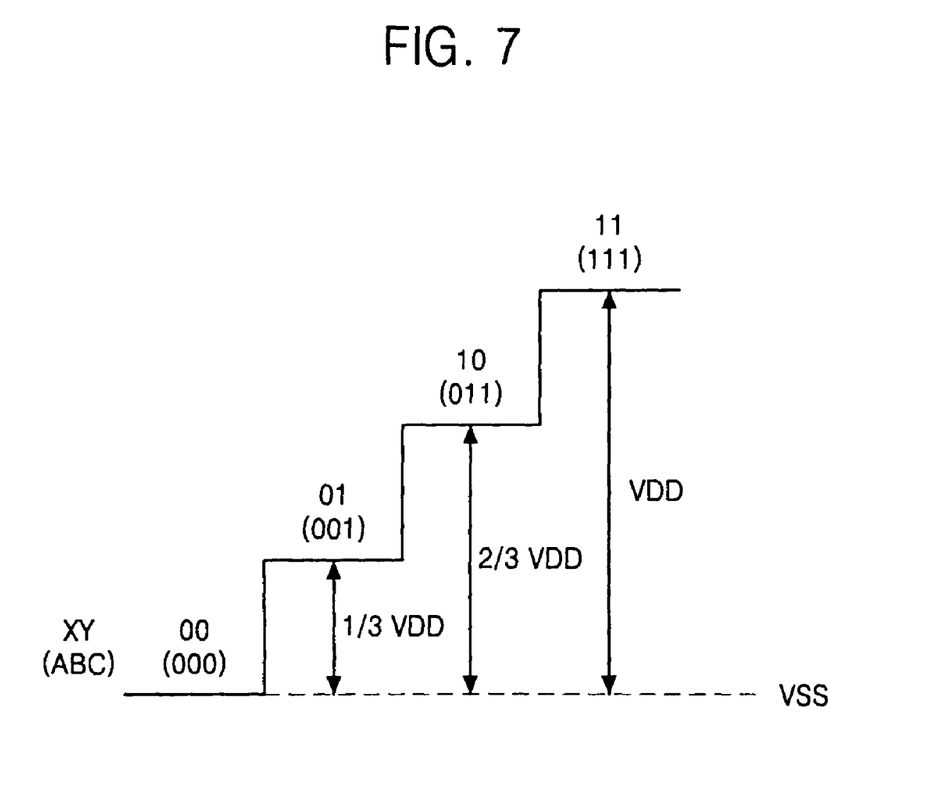
FIG. 7 illustrates the four possible levels of an output signal of the level generator of FIG. 4, according to an example embodiment of the present invention.

FIG. 7 shows the four possible voltage levels of the output signal OUT+ of the level generator 150 of FIG. 4. Referring to FIG. 7, when the 3-bit thermometer code ABC is 000, the level generator 150 generates the output signal OUT+ having a first voltage level VSS that is a low power supply voltage. When the 3-bit thermometer code ABC is 001, the level generator 150 generates the output signal OUT+ having a second voltage level (⅓)*VDD, with VDD being a high power supply voltage.

When the 3-bit thermometer code ABC is 011, the level generator 150 outputs the output signal OUT+ having a third voltage level (⅔)*VDD. When the 3-bit thermometer code ABC is 111, the level generator 150 outputs the output signal OUT+ having a fourth voltage level VDD.

In this manner, the transformer 130 operates with the modified clock signal CLK2 having a higher frequency than in the prior art resulting in high speed operation for transmitting data as the output signal OUT+. Furthermore, each K-bit unit is generated by the 2-bit data formatter 113 from one N-bit data without waiting for a subsequent N-bit data resulting in higher speed operation of the data formatter 113.

While the present invention has been particularly shown and described with reference to exemplary embodiments thereof, it will be understood by those of ordinary skill in the art that various changes in forms and details may be made therein without departing from the spirit and scope of the present invention as defined by the following claims.

What is claimed is:

1. An image sensor comprising:
a data formatter that divides N-bit data into K-bit units with N and K being natural numbers and with K<N; and
a transformer configured to generate an output signal having a respective signal level selected from at least three possible levels depending on each K-bit unit received from the data formatter.

2. The image sensor of claim 1, further comprising:
a pixel array for generating an analog signal from an image; and
an analog-to-digital converter for generating the N-bit data from the analog signal.

3. The image sensor of claim 1, wherein N/K is a natural number greater than 1.

4. The image sensor of claim 1, wherein the N-bit data is timed to an original clock signal, and wherein the K-bit units are timed to a modified clock signal having a period that is K-times a period of the original clock signal.

5. The image sensor of claim 4, wherein the data formatter generates the modified clock signal.

6. The image sensor of claim 5, further comprising:
a clock buffer disposed in the transformer for generating a buffered clock signal from the modified clock signal.

7. The image sensor of claim 4, wherein the transformer includes:
an encoder that transforms each K-bit unit from the data formatter into a respective M-bit data with M>K; and
a level generator that generates the output signal having the respective signal level depending on the respective M-bit data.

8. The image sensor of claim 7, wherein the respective M-bit data is a respective thermometer code for each K-bit unit.

9. The image sensor of claim 7, wherein the N-bit data is timed to an original clock signal, and wherein the K-bit units are timed to a modified clock signal having a period that is K-times a period of the original clock signal, and wherein the encoder operates with the modified clock signal.

10. The image sensor of claim 9, wherein the encoder includes:
a plurality of logic gates each inputting at least one bit of a K-bit unit; and
a plurality of flip-flops for latching an output of a respective logic gate according to the modified clock signal.

11. The image sensor of claim 7, wherein the level generator includes a plurality of amplifiers each inputting a differential pair of a respective bit of each M-bit data.

12. The image sensor of claim 11, wherein the plurality of amplifiers have differential outputs that are coupled to generate complementary outputs of the output signal.

13. The image sensor of claim 7, wherein N=10, K=2, and M=3, and wherein the signal level of the output signal is selected from four possible levels.

14. The image sensor of claim 1, wherein the image sensor is a CMOS (complementary metal oxide semiconductor) image sensor.

15. An image sensor comprising:
a data formatter that divides N-bit data into K-bit units with N and K being natural numbers and with K<N; and
means for generating an output signal having a respective signal level selected from at least three possible levels depending on each K-bit unit received from the data formatter.

16. The image sensor of claim 15, further comprising:
a pixel array for generating an analog signal from an image; and
an analog-to-digital converter for generating the N-bit data from the analog signal.

17. The image sensor of claim 15, wherein N/K is a natural number greater than 1.

18. The image sensor of claim 15, wherein the N-bit data is timed to an original clock signal, and wherein the K-bit units are timed to a modified clock signal having a period that is K-times a period of the original clock signal.

19. The image sensor of claim 18, wherein the data formatter generates the modified clock signal.

20. The image sensor of claim 19, further comprising:
a clock buffer disposed in the transformer for generating a buffered clock signal from the modified clock signal.

* * * * *